United States Patent
Derzon et al.

(10) Patent No.: US 11,061,164 B1
(45) Date of Patent: Jul. 13, 2021

(54) SYSTEM, ALGORITHM, AND METHOD USING SHORT PULSE INTERROGATION WITH NEUTRONS TO DETECT AND IDENTIFY MATTER

(71) Applicant: National Technology & Engineering Solutions of Sandia, LLC, Albuquerque, NM (US)

(72) Inventors: Mark S. Derzon, Albuquerque, NM (US); Aaron Powledge, Cedar Crest, NM (US); Lorenzo Gutierrez, Albuquerque, NM (US); Markku J. Koskelo, Albuquerque, NM (US); Paul C. Galambos, Albuquerque, NM (US); Nathan Price, Albuquerque, NM (US); Carlton F. Brooks, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 219 days.

(21) Appl. No.: 16/433,576

(22) Filed: Jun. 6, 2019

(51) Int. Cl.
 *G01T 1/28* (2006.01)
 *G01V 5/00* (2006.01)
(52) U.S. Cl.
 CPC .............. *G01V 5/0069* (2016.11); *G01T 1/28* (2013.01); *G01V 5/0091* (2013.01)
(58) Field of Classification Search
 CPC .................................. G01T 1/28; G01V 5/0091
 See application file for complete search history.

(56) References Cited

U.S. PATENT DOCUMENTS

| | | | | | |
|---|---|---|---|---|---|
| 4,447,727 | A | * | 5/1984 | Friesenhahn | H01J 47/1244 250/374 |
| 4,509,042 | A | * | 4/1985 | Kruse | G01T 1/208 250/361 R |

(Continued)

OTHER PUBLICATIONS

Coop, K. L. et al., "A Neutron Portal Monitor for Vehicles," Institute of Nuclear Materials Management Meeting, Newport Beach, CA, Jul. 12-15, 1987, 8 pages.

(Continued)

*Primary Examiner* — David P Porta
*Assistant Examiner* — Djura Malevic
(74) *Attorney, Agent, or Firm* — Mark A. Dodd

(57) ABSTRACT

A system, method, and algorithm for detecting and identifying special nuclear material (SNM) (including fissionable material), explosives, or drugs is disclosed. This material detection system relies on active interrogation of material using a short, intense neutron pulse, and characterization of the resulting prompt gamma response in two short time windows, the first concurrent with and the second immediately following the end of the neutron pulse, optionally subject to a total transit delay time of the neutrons from the neutron source to the target and from the target to the gamma detector. A high data rate analysis system implements data stream analysis and statistical correlations of the two short time window gamma responses to rapidly detect or identify SNM, explosives, or drugs. The duration of the neutron pulse is so short that minimal dose results. Various shields help to minimize the background signal falling on the gamma detector to improve sensitivity.

19 Claims, 6 Drawing Sheets

(56) References Cited

U.S. PATENT DOCUMENTS

| | | | | |
|---|---|---|---|---|
| 5,479,023 A * | 12/1995 | Bartle | G01V 5/0033 | 250/359.1 |
| 5,539,788 A * | 7/1996 | Ruddy | G01N 23/222 | 250/253 |
| 5,818,054 A * | 10/1998 | Randers-Pehrson | G01N 23/18 | 250/390.04 |
| 5,838,759 A * | 11/1998 | Armistead | G01V 5/0033 | 378/57 |
| 6,344,818 B1 * | 2/2002 | Markov | G01V 3/12 | 342/193 |
| 6,347,132 B1 * | 2/2002 | Annis | G01N 23/04 | 378/57 |
| 7,151,815 B2 * | 12/2006 | Ruddy | G01V 5/0091 | 376/158 |
| 7,274,020 B1 * | 9/2007 | Hindi | G01T 1/20 | 250/363.01 |
| 7,359,480 B2 * | 4/2008 | Slaughter | G01T 3/00 | 250/390.04 |
| 7,391,031 B1 * | 6/2008 | Zillmer | G01N 23/222 | 250/390.04 |
| 7,420,175 B2 * | 9/2008 | Chu | G01V 5/0069 | 250/358.1 |
| 7,430,479 B1 * | 9/2008 | Holslin | G01T 1/167 | 250/359.1 |
| 7,453,987 B1 * | 11/2008 | Richardson | G01V 5/0041 | 378/57 |
| 7,474,725 B2 * | 1/2009 | Norman | G01V 5/0091 | 250/363.01 |
| 7,483,509 B2 * | 1/2009 | Norman | G01V 5/0091 | 250/363.01 |
| 7,529,332 B2 * | 5/2009 | Norman | G01V 5/0091 | 250/363.01 |
| 7,551,714 B2 * | 6/2009 | Rothschild | G01N 23/046 | 378/44 |
| 7,573,039 B2 * | 8/2009 | Smith | G01T 1/1647 | 250/370.09 |
| 7,573,044 B2 * | 8/2009 | Norris | G01V 5/0008 | 250/390.04 |
| 7,663,119 B2 * | 2/2010 | Sved | G01T 3/00 | 250/390.01 |
| 8,080,808 B2 * | 12/2011 | Norris | G01V 5/0008 | 250/390.04 |
| 8,373,129 B2 * | 2/2013 | Kotlick | G01T 1/00 | 250/358.1 |
| 8,410,451 B2 * | 4/2013 | Norris | G01V 5/0069 | 250/393 |
| 8,461,534 B1 * | 6/2013 | Koltick | G01V 5/0069 | 250/358.1 |
| 8,541,756 B1 * | 9/2013 | Treas | G01N 23/09 | 250/398 |
| 8,586,939 B2 * | 11/2013 | Bingham | G01V 5/0008 | 250/390.02 |
| 8,680,477 B2 * | 3/2014 | Nose | G01N 23/222 | 250/393 |
| 8,748,837 B2 * | 6/2014 | Carasco | G01V 5/00 | 250/389 |
| 8,963,071 B2 * | 2/2015 | Koltick | G01V 5/0069 | 250/253 |
| 9,081,099 B2 * | 7/2015 | Kang | G01T 3/00 | |
| 9,255,899 B2 * | 2/2016 | Nose | G01N 23/222 | |
| 9,268,043 B2 * | 2/2016 | DeVolpi | G21C 17/00 | |
| 9,897,556 B2 * | 2/2018 | Mitra | G01N 23/025 | |
| 9,939,550 B2 * | 4/2018 | Clayton | G01V 5/0091 | |
| 2003/0165212 A1 * | 9/2003 | Maglich | G01N 23/222 | 376/156 |
| 2003/0213917 A1 * | 11/2003 | Menlove | G01T 3/00 | 250/390.01 |
| 2004/0212499 A1 * | 10/2004 | Bohinc, Jr. | G01V 5/0075 | 340/539.29 |
| 2005/0018802 A1 * | 1/2005 | Craig | G01T 3/00 | 376/158 |
| 2005/0023474 A1 * | 2/2005 | Persyk | G01T 1/2985 | 250/370.1 |
| 2005/0254614 A1 * | 11/2005 | McKinny | G01N 23/2257 | 376/159 |
| 2007/0001123 A1 * | 1/2007 | Andrews | G01T 1/361 | 250/394 |
| 2007/0069145 A1 * | 3/2007 | Leonhardt | G01V 5/0069 | 250/390.04 |
| 2007/0069146 A1 * | 3/2007 | Neal | G01T 3/06 | 250/390.11 |
| 2008/0002810 A1 * | 1/2008 | Slaughter | G01T 3/00 | 378/57 |
| 2008/0017806 A1 * | 1/2008 | Norris | G01V 5/0069 | 250/390.04 |
| 2008/0128628 A1 * | 6/2008 | Moses | G01T 3/08 | 250/370.05 |
| 2008/0135772 A1 * | 6/2008 | Claus | G01V 5/0091 | 250/390.01 |
| 2008/0156997 A1 * | 7/2008 | Kearfott | G01V 5/0025 | 250/390.04 |
| 2008/0240329 A1 * | 10/2008 | Norman | G01V 5/0091 | 376/154 |
| 2009/0010373 A1 * | 1/2009 | Jestice | G01T 3/00 | 376/153 |
| 2009/0067574 A1 * | 3/2009 | Johnson | G01V 5/0033 | 378/57 |
| 2009/0175401 A1 * | 7/2009 | Bertozzi | G01V 5/0091 | 376/154 |
| 2010/0046690 A1 * | 2/2010 | Proctor | G01V 5/0091 | 376/154 |
| 2010/0065727 A1 * | 3/2010 | Choi | G01V 5/0033 | 250/251 |
| 2010/0090097 A1 * | 4/2010 | Koltick | G01T 1/00 | 250/251 |
| 2010/0148084 A1 * | 6/2010 | Sved | G01T 3/00 | 250/390.04 |
| 2010/0294415 A1 * | 11/2010 | Frank | G01T 3/00 | 156/64 |
| 2010/0332145 A1 * | 12/2010 | Rowland | G01V 5/0091 | 702/22 |
| 2011/0024639 A1 * | 2/2011 | Dazeley | G01T 3/008 | 250/366 |
| 2011/0108738 A1 * | 5/2011 | Doty | C09K 11/06 | 250/459.1 |
| 2012/0037811 A1 * | 2/2012 | Dunn | G01T 7/00 | 250/391 |
| 2012/0037812 A1 * | 2/2012 | Norris | G01T 3/00 | 250/393 |
| 2012/0175525 A1 * | 7/2012 | Frank | G01T 3/06 | 250/390.01 |
| 2012/0267540 A1 * | 10/2012 | Frank | G01V 5/0091 | 250/394 |
| 2012/0314827 A1 * | 12/2012 | Dioszegi | G21G 1/08 | 376/156 |
| 2014/0042330 A1 * | 2/2014 | Gozani | G01V 5/0075 | 250/367 |
| 2014/0252520 A1 * | 9/2014 | Dahal | G01T 3/00 | 257/429 |
| 2015/0060686 A1 * | 3/2015 | DeVolpi | G21D 1/00 | 250/390.1 |
| 2015/0323473 A1 * | 11/2015 | Mitra | G01N 23/02 | 250/390.04 |
| 2016/0187270 A1 * | 6/2016 | Dioszegi | G01N 23/222 | 376/159 |
| 2016/0266260 A1 * | 9/2016 | Preston | G01T 1/208 | |
| 2017/0357026 A1 * | 12/2017 | Gallagher | G01V 5/0075 | |
| 2020/0041685 A1 | 2/2020 | Podpaly et al. | | |

OTHER PUBLICATIONS

Eberhardt, J. et al., "Fast-neutron/gamma-ray radiography scanner for the detection of contraband in air cargo containers," Proc. SPIE 6213, Non-Intrusive Inspection Technologies, 621303 (May 5, 2006); doi: 10.1117/12.663984, 11 pages.

(56) References Cited

OTHER PUBLICATIONS

Eberhardt, J. E. et al., "Fast neutron radiography scanner for the detection of contraband in air cargo containers," Applied Radiation and Isotopes (2005) 63:179-188.

Gozani, T., "Advances in accelerator based explosives detection systems," Nuclear Instruments and Methods in Physics Research (1993) B79:601-604.

Gozani, T., "Understanding the physics limitations of PFNA—the nanosecond pulsed fast neutron analysis," Nuclear Instruments and Methods in Physics Research B (1995) 99:743-747.

Improvement of Technical Measures to Detect and Respond to Illicit Trafficking of Nuclear and Radioactive Materials, International Atomic Energy Agency (IAEA), Jul. 2008, IAEA-TECDOC-1596-CD, 642 pages.

Treaty on the Non-Proliferation of Nuclear Weapons, International Atomic Energy Agency Information Circular, INFCIRC/140, Apr. 22, 1970, 5 pages.

The Structure and Content of Agreements Between the Agency and States Required in Connection with the Treaty on the Non-Proliferation of Nuclear Weapons, International Atomic Energy Agency, INFCIRC/153, Corrected, Jun. 1972, 34 pages.

Model Protocol Additional to the Agreement(s) Between State(s) and the International Atomic Energy Agency for the Application of Safeguards, International Atomic Energy Agency, INFCIRC/540, Corrected, Sep. 1997, 65 pages.

Jones, J. L. et al., "Proof-of-Concept Assessment of a Photofission-Based Interrogation System for the Detection of Shielded Nuclear Material," Idaho National Engineering and Environmental Laboratory, Idaho Falls, Idaho, Nov. 2000, 33 pages.

Koskelo, M. et al., "Sustainability of Gamma-ray Isotopics Evaluation Codes," INMM 51st Annual Meeting, Baltimore, MD, Jul. 11-15, 2010, 15 pages.

Kouzes, R. T. et al., "Passive neutron detection for interdiction of nuclear material at borders," Nuclear Instruments and Methods in Physics Research A (2008) 584:383-400.

Mihalczo, J. T. et al., "Physical description of nuclear materials identification system (NMIS) signatures," Nuclear Instruments and Methods in Physics Research A (2000) 450:531-555.

Reilly, D. et al. (eds.), Passive Nondestructive Assay of Nuclear Materials, U.S. Nuclear Regulatory Commission, Mar. 1991, 723 pages.

Runkle, R. C. et al., "Rattling nucleons: New developments in active interrogation of special nuclear material," Nuclear Instruments and Methods in Physics Research A (2012) 663:75-95.

Sampson, T. E. et al., "Portal Monitor for Diversion Safeguards," American Nuclear Society meeting, San Francisco, CA, Nov. 12-15, 1973, 19 pages.

Schumer, J. W. et al., "Development of an Intense Pulsed Characteristic γ-Ray Source for Active Interrogation of Special Nuclear Material," 2007 IEEE Nuclear Science Symposium Conference Record (2007) 2:1026-1032.

Slater, C. O. et al., Irradiation Effects for the Pulsed Fast Neutron Analysis (PFNA) Cargo Interrogation System, Oak Ridge National Laboratory, ORNL/TM-2000-352, Feb. 2001, 552 pages.

Krishnan, M., "The Dense Plasma Focus: A Versatile Dense Pinch for Diverse Applications," IEEE Transactions on Plasma Science (2012) 40(12):3189-3221.

\* cited by examiner

SYSTEM, ALGORITHM, AND METHOD USING SHORT PULSE INTERROGATION WITH NEUTRONS TO DETECT AND IDENTIFY MATTER

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to the detection and identification of fissionable and other materials and characterization of background materials with minimal dose. Applications include neutron prompted gamma emission analysis for detection of special nuclear material (SNM) and weapons of mass destruction (WDM), as well as other materials, for example explosives and drugs.

BACKGROUND

Systems that can search cargo for SNM without delaying commerce, provide information regarding found Improvised Nuclear Devices (IND), and acquire SNM information using low-hazard methods are critical to ensuring US national security. Similar needs exist for detecting hidden explosives and drugs. In addition, terrestrial and space mining applications require rapid methods of interrogating material for identification of high-value fissionable material. A discussion of the state-of-the art for passive and active methods for detecting fissionable material, explosives, and drugs follows. While the following discussion refers to several publications and references, the number of publications in the field of detection of SNM and explosives is extensive, and the references cited herein are not intended to be comprehensive. Instead, the publications given are selected to illustrate the background of specific methods and their scientific principles only.

Outside the nuclear weapons development needs, methods for detecting and/or quantifying SNM for declared and later undeclared purposes were first developed for safeguards purposes. The international safeguards organizations use a variety of gamma and neutron detectors to inspect declared activities known to involve SNM for verifying the correctness of the records for materials types and their quantities. See, for example, International Atomic Energy Agency, "Treaty on the Non-Proliferation of Nuclear Weapons," INFCIRC/140 (1970); International Atomic Energy Agency, "The Structure and Content of Agreements Between the Agency and States Required in Connection with the Treaty on the Non-Proliferation of Nuclear Weapons," INFCIRC/153 (corrected) (1972), the contents of each are incorporated herein by reference. Since the advent of the Additional Protocol, see International Atomic Energy Agency, "Model Protocol Additional to the Agreement(s) between State(s) and the International Atomic Energy Agency for the Application of Safeguards," INFCIRC/540 (corrected) (1997), the contents of which are incorporated herein by reference, the international safeguards organization also looks for undeclared or hidden SNM.

High and medium resolution gamma systems with the appropriate software are common in safeguards to verify uranium enrichment and plutonium isotopics. Such systems are often combined with neutron counters for quantification of the SNM materials. Similar systems are also used in nuclear and radioactive waste assay measurements where the waste is known to have SNM in it or is suspected of having SNM in it.

In addition to the passive techniques, the technology for active interrogation systems is common for safeguards and waste assay when the passive signal is too weak to give a useful measurement result. Active systems, such as active well counters, differential die-away systems, Cf-252 shufflers, and Add-a-Source systems, are in use throughout the U.S. Department of Energy complex for waste assay and in international safeguards. The basic technology and physics of these types of active and passive systems is mature and well understood. See, for example, Los Alamos National Laboratory, "Passive Nondestructive Assay of Nuclear Materials," D. Reilly et al. eds. (1991), the contents of which are incorporated herein by reference, and the references cited therein.

These safeguards and waste systems are not well suited for searching and detecting SNM materials in baggage, cargo, or various other field situations. The systems are often very large and very expensive. Passive systems are designed to either measure the amount of plutonium very accurately for safeguards accounting purposes, or to find a very small amount of plutonium in a large waste container. This can only be done with very long count times and large detectors, and/or large numbers of detectors. A typical count time is about one hour per container. Uranium cannot be measured with passive systems in the presence of other materials. An active system can be used for detecting both shielded and unshielded uranium.

Portable high or medium resolution gamma spectrometers can measure the enrichment of unshielded uranium samples or measure the isotopics of an unshielded plutonium sample. See, for example, M. J. Koskelo et al., "Sustainability of Gamma-ray Isotopics Evaluation Codes," presented at the 51$^{st}$ Annual Institute of Nuclear Materials Management Meeting, Baltimore, Md., (Jul. 11-15, 2010), the contents of which are incorporated herein by reference. But, the fact that the material must be unshielded makes these systems impractical for inspecting unknown objects with unknown shielding. In other words, these systems are not designed to accurately detect either type of material at a distance, or when the sample is shielded.

Passive radiation portal monitors (RPMs) were initially designed in the context of safeguards and nuclear security to prevent someone from walking away from a facility with SNM. The first reports describing the concept date back as far as 1973. See, for example, T. E. Sampson et al., "Portal monitor for diversion safeguards," presented at the American Nuclear Society Meeting, San Francisco, Calif., (Nov. 11-16, 1973), the contents of which are incorporated herein by reference. The first U.S. RPM configuration patents appear as early as 1985. See, for example, U.S. Pat. No. 4,509,042 (issued Apr. 2, 1985), the contents of which are incorporated herein by reference. The first RPM systems measured for gamma radiation and did some signal processing to differentiate SNM from changes in the natural background. Extensive shielding of the SNM was initially not a concern. The ability to detect neutrons was soon added to the portal monitoring concept, first with a complicated method. See, for example, U.S. Pat. No. 4,447,727 (issued May 8, 1984), the contents of which are incorporated herein by reference. Subsequently, neutron detectors employing He-3 detectors with moderators were developed. See, for example, K. L. Coop et al., "A Neutron Portal Monitor for Vehicles," presented at the 28$^{th}$ Annual Institute of Nuclear Materials Management Meeting, Newport Beach, Calif. (Jul. 12-15, 1987), the contents of which are incorporated herein by reference. Portal monitor designs became commercially available through several companies in the 1990s. The need for such devices grew explosively after the events of Sep. 11, 2001. However, the current devices used at border crossing and other checkpoints, both in the U.S. and elsewhere, still use the same basic principles and science developed in the 1970s and 1980s. The number of detectors, their size, the signal processing, and the analysis algorithms have been updated and modernized for the new mission that often involves being able to make the measurement in a very short period and finding heavily shielded SNM.

In this new environment, these portal monitors must be able to adapt to varying natural radiation backgrounds, which in field conditions is much more variable than inside facilities. They must also be able to discriminate against medical or industrial radioactive sources that may be present, something that was rarely an issue in the 1970s. This is not a simple task given the short time allowed for the measurement, the limited resolution of the detectors for cost effectiveness, and the very weak spontaneous gamma and neutron emissions from SNM. For relatively recent reviews of these issues, see, for example, R. T. Kouzes et al., "Passive neutron detection for interdiction of nuclear materials at borders," Nuclear Instruments and Methods in Physics Research A, vol. 584, pp. 383-400 (2008); International Atomic Energy Agency, "Improvement of Technical Measures to Detect and Respond to Illicit Trafficking of Nuclear and Radioactive Materials," IAEA-TECDOC-1596-CD (2008), the contents of each are incorporated herein by reference.

A variety of active interrogation systems for cargo and baggage inspection for both explosives and fissile materials/SNM exist. Many of these systems started with explosives detection systems where the object of interest was irradiated with neutrons, and the signal of interest was characteristic prompt gamma rays produced by the absorption of such neutrons in the elements present in explosives. This class of analysis, entitled prompt gamma neutron activation analysis (PGNAA), quickly developed into several sub-methods, such as thermal neutron activation (TNA), pulsed thermal neutron activation (PTNA), fast neutron activation (FNA), pulsed fast neutron activation (PFNA), etc. See, for example, T. Gozani, "Advances in accelerator based explosives detection systems," Nuclear Instruments and Methods in Physics Research B, vol. 79, pp. 601-604 (1993); T. Gozani, "Understanding the physics limitations of PFNA—the nanosecond pulsed fast neutron analysis," Nuclear Instruments and Methods in Physics Research B, vol. 99, pp. 743-747 (1995), the contents of each are incorporated herein by reference. While the physics of the method worked, the implementation gave rise to concerns about the effects of the powerful irradiation involved. See, for example, C. O. Slater et al., "Irradiation Effects for the Pulsed Fast Neutron Analysis (PFNA) Cargo Interrogation System," Oak Ridge National Laboratory Report ORNL/TM-2000/352 (2001), the contents of which are incorporated herein by reference.

When the explosives detection systems were adapted for SNM detection, the measured signal was based on gamma rays characteristic of SNM as opposed to characteristic gamma rays of explosives. See, for example, U.S. Pat. No. 7,359,480 (issued Apr. 15, 2008), the contents of which are incorporated herein by reference. Alternatively, the measured signal was based on induced neutrons emitted by the object of interest between the pulses of interrogating neutrons. See, for example, U.S. Pat. No. 7,151,815 (issued Dec. 19, 2006), the contents of which are incorporated herein by reference. Some methods rely on interrogation of the object of interest with high-energy photons and detecting the characteristic neutrons emitted by the SNM if such material is present. See, for example, J. L. Jones et al., "Proof-of-Concept Assessment of a Photofission-Based Interrogation System for the Detection of Shielded Nuclear Material," Idaho National Laboratory Report INEEL/EXT-2000-01523 (2000), the contents of which are incorporated herein by reference. There is even a standard for active interrogation systems for cargo and baggage scanning for the Department of Homeland Security. See, for example, American National Standard, "Minimum Performance Criteria for Active Interrogation Systems Used for Homeland Security," ANSI N42.41-2007 (2007).

These active SNM detection systems generally need long count times or otherwise do not have the detection sensitivity for field operation and pose several other logistics problems as well. Many systems that use neutron generators or photon accelerators are too large, too powerful, too expensive, and/or create too much exposure for the personnel running them to be practical for the rapid, man-portable detection capability needed. Even with sufficiently powerful neutron or photon generators, these designs still need large detectors, often in large numbers, to achieve the desired detection sensitivity. This makes the systems very expensive.

An analysis of the above neutron techniques shows that current efforts to detect SNM follows the paradigm of using long-pulsed systems, pulsed fast neutron analysis (PFNA), or associated particle methods. There is also detection work using just gamma sources, in which the physics is different but many of the goals and techniques are similar. The most relevant work related to the present invention but using gamma interrogation is that of Schumer et al. because they propose a short pulse. See, for example, J. W. Schumer et al., "Development of an Intense Pulsed Characteristic γ-Ray Source for Active Interrogation of Special Nuclear Material," IEEE Nuclear Science Symposium Conference Record, N19-5, pp. 1026-1032 (2007), the contents of which are incorporated herein by reference. Eberhardt et al. is pursuing both gamma and neutron interrogation in long-pulsed systems. See, for example, J. Eberhardt et al., "Fast-neutron/gamma-ray radiography scanner for the detection of contraband in air cargo containers," Proceedings of SPIE Non-Intrusive Inspection Technologies, art. no. 621303 (2006), the contents of which are incorporated herein by reference. Neither Schumer et al. nor Eberhardt et al. use a single intense short neutron pulse for detection such as used in the present invention.

In spite of these previous efforts, the need still exists for a compact system to detect and identify matter, including SNM, that is safe, rapid, and cost effective.

SUMMARY

In response to this need, various embodiments of the present invention provide an active detection system, algorithm, and methodology for detecting fissionable material that produces a much lower dose for the operators and the inspected items and requires much less time than the existing state-of-the-art detection systems. In Derzon et al., the authors describe an experiment using a large dense plasma focus to irradiate a 2 kg sample of depleted uranium. The experiment measured a signal-to-noise ratio of 40 at a distance of two meters. See, M. Derzon et al., "Proof-of-Principle Experiment Results for SNM Detection by Short Pulse Interrogation using Neutrons (SPINs)," Journal of Radiation Effects Research and Engineering, (2011). The implication from this crude, simple proof-of-principle experiment was that a short, intense pulse of neutrons could be used to detect SNM using the prompt gamma response of the SNM. While the concept needed to be further explored for specific applications, these initial results provided confidence in the SPIN technique. While the following description is centered on how the method works for SNM detection, various embodiments of the invention are not limited to just SNM. Any materials that emit characteristic prompt gamma rays in specific ratios, i.e., have a "fingerprint," can be detected by this method. Such additional materials include explosives and drugs.

The general system, algorithm, and method of the present invention employ a neutron source to generate an interrogation pulse. The neutrons in the interrogation pulse interact with a target. The system is configured so that a gamma detector sees the target but does not see the neutron source. The interaction of the neutrons in the interrogation pulse with the target results in a detection pulse caused by the emission of gamma radiation that is characteristic of the material in the target. The timing and energy of the prompt gammas in the detection pulse are different from the timing and energy of gammas from the background. This prompt gamma portion of the detection pulse contains identifying features that are primarily observed while the neutron source is on or within the first approximately 500 nanoseconds after the interrogation pulse ends. Therefore, the gamma detector has a high data rate and may include a high-sensitivity scintillator and a photomultiplier tube. The data stream from the gamma detector is analyzed using an algorithm that rapidly converts the data stream into gamma spectra. The algorithm bins both the time and the magnitude of the responses to create the spectra. The algorithm emphasizes the short time, fissionable material prompt gamma response to maximize the signal-to-noise ratio of the binned signals.

This method is much faster than the current state-of-the-art systems for the same purpose and provides a much lower dose to the item being interrogated and the system operators. This is because only a single, very short duration neutron pulse is needed, and the greatest number of neutron-photon decays occurs at a very short time after the interaction. Therefore, various embodiments of the present invention employ a very high rate detector and a very short neutron pulse. Table 1 shows a summary comparison of this SPIN system method with state-of-the-art active detection. Safety and dose considerations are very important for the effective use of any active detection system (see column 3 of Table 1). The values in Table 1 are derived from J. Eberhardt et al., "Fast neutron radiography scanner for the detection of contraband in air cargo containers," Applied Radiation and Isotopes, vol. 63, pp. 179-188 (2005); R. C. Runkle et al., "Rattling nucleons: New developments in active interrogation of special nuclear material," Nuclear Instruments and Methods in Physics Research A, Vol. 663, PP. 75-95 (2012); J. T. Mihalczo et al., "Physical description of nuclear materials identification system (NMIS) signatures," Nuclear Instruments and Methods in Physics Research Section A, vol. 450, pp. 531-555 (2000), the contents of each are incorporated herein by reference.

TABLE 1

Parameter assessment for various methods of active detection.

| Method | Group | Estimated Normalized Neutron Source Dose† | Estimated Interrogation Time/Target | Effectiveness |
|---|---|---|---|---|
| Combined Neutron and Gamma (Long Pulse) | Eberhardt | 5000 | 180 seconds (at 1 meter/minute scan rate for a 3 meter target) | Imaging 2D Z map |
| Delayed Neutrons Differential Die Away (14 MeV) | Runkle | 100 | 500 seconds | Presence of SNM |
| Associated Particle (Prompt and Delayed) | Mihalczo. | 400 | 600 seconds | Presence of SNM |
| Short Pulse Intense Neutron (SPIN) Sensing | Derzon | 1 | <1 second | Presence, quantity, and approximate location of SNM or other materials |

†Estimated Normalized Neutron Source Dose = (Group Src/SPIN Src)*(SPIN Solid Angle/Group Solid Angle)*(SPIN Estimated Detector Efficiency/Group Estimated Detector Efficiency)

Various embodiments of the present invention capture and analyze prompt gamma and neutron emissions from a material to characterize its chemical elements. The process simplifies characterization of target materials over other techniques, for example, PFNA, by using detection signal outputs directly from recorded data streams. This eliminates the prior art's requirement for analog electronics, such as spectroscopy amplifiers, pulse shapers, and multichannel analyzers. Long timescale analysis can still be performed, however simple data recorders can substitute for complex electronics while capturing much more information.

The experiment described in the previously cited M. Derzon et al. article has been significantly expanded by more recent work, which forms the basis for the present invention. The system, method, and algorithm of various embodiments of the present invention provide a solution to the problem of identifying fissionable material in the field with a person-portable system. By adapting the demonstrated system to a smaller form factor that utilizes the same concepts, both the source and the sensor can have masses that are low enough to be launched into space for mining applications.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
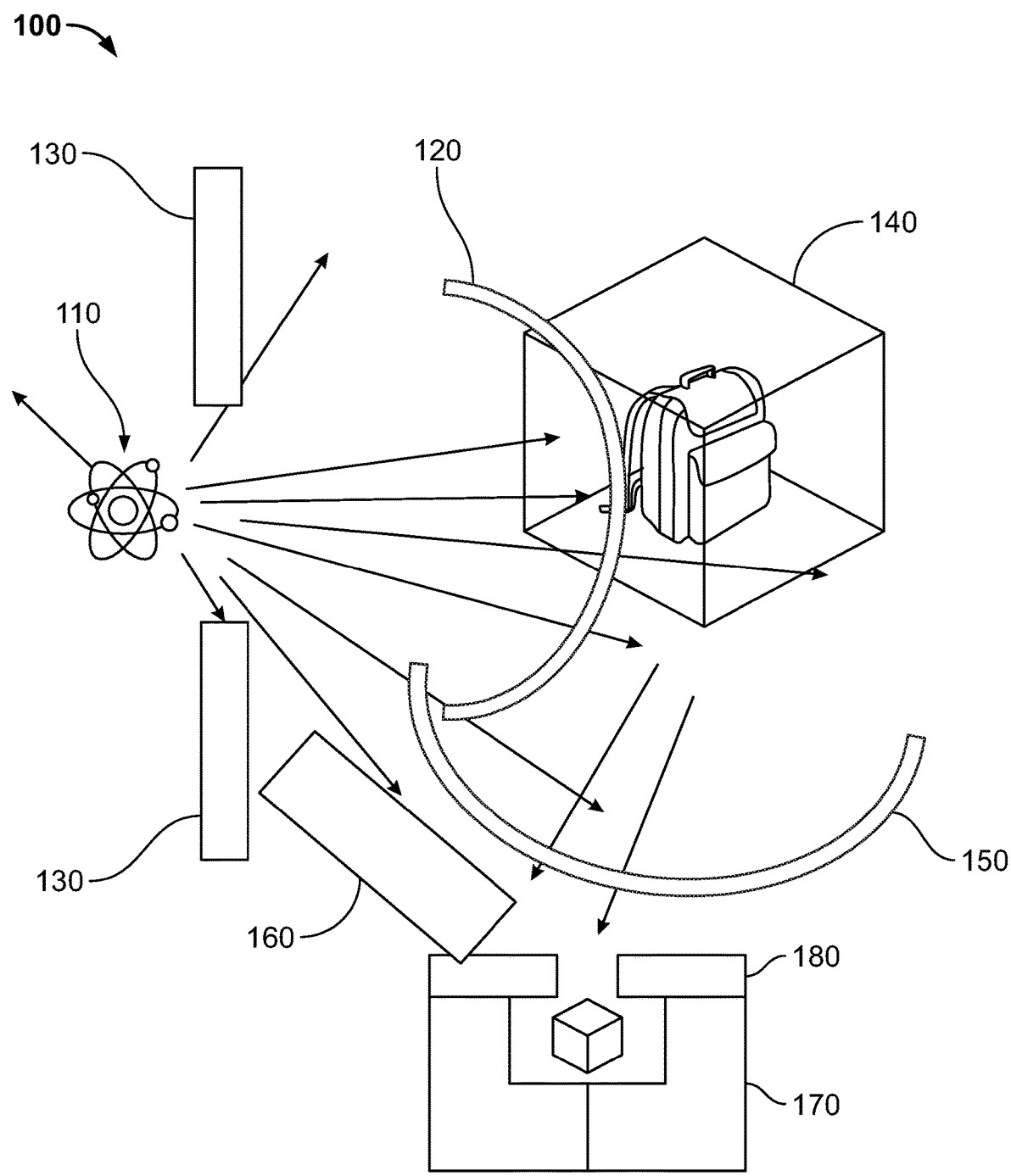
FIG. 1 illustrates the basic geometry of a near field configuration in accordance with one or more embodiments of the present invention.

A SPIN-based material detection system 100, in accordance with various embodiments of the present invention, is shown in FIG. 1, which illustrates a neutron source 110 that is a point in time, space, and energy. In a preferred embodiment of the present invention, the SPIN-based material detection system 100 uses a neutron source 110 that is an isotropic source of monoenergetic fast neutrons created at an instant in time, i.e., a single neutron pulse. The neutron source 110 then would radiate an interrogation pulse 120, having a duration $\tau$, where the energy of the neutrons in the interrogation pulse 120 determines the interrogation pulse's velocity $v_i$. The neutron source 110 includes a source shield 130 that limits the solid angle of the interrogation pulse, thereby reducing the neutron dose in directions that do not matter for the interrogation. The neutrons in the interrogation pulse 120 interact with a target 140 and its environment. The target 140 may be unshielded or shielded (shielding of target 140 is not illustrated). The interrogation pulse 120 arrives at the target 140 in a target transit time $t_i$ corresponding to $d_1/v_i$, where $d_1$ is the distance from the neutron source 110 to the target 140. While some embodiments of the present invention take this target transit time of the interrogation pulse 120 into account, others do not. In yet other embodiments of the present invention, the results of ignoring the target transit time are combined with the results that do include the target transit time.

The interrogation pulse 120 induces the target 140 to emit particles and radiation in the form of a detection pulse 150 such as prompt fission neutrons, alpha and beta particles, x-rays, and gammas with time-of-flight characteristics given by the characteristic energy distribution of the SNM and surrounding materials. Preferably, a direct neutron shield 160 is placed between the neutron source 110 and a gamma detector 170 to prevent neutrons and gammas from the direction of the neutron source 110 from directly impacting the gamma detector 170. The detection pulse 150 also contains a large number of scattered neutrons, alpha and beta particles, and radiation from neutron-gamma interactions. The SPIN-based material detection system 100 is configured so that the gamma detector 170 sees the target 140 and the detection pulse 150 directly but does not directly see the interrogation pulse 120 from the neutron source 110.

The interaction of the neutrons in the interrogation pulse 120 with the target 140 results in the detection pulse 150, which includes the emitted gamma radiation that is characteristic of the material in the target 140 as well as a background gamma signature. The detection pulse will have its own corresponding speed $v_d$. The detection pulse 150 arrives at the gamma detector 170 from the target 140 in a detector transit time $t_d$ corresponding to $d_2/v_d$, where $d_2$ is the distance from the target 140 to the gamma detector 170. As with the target transit time, some embodiments of the present invention take the detector transit time into account, while others do not. In yet other embodiments of the present invention, the results of ignoring this detector transit time are combined with the results that do include the detector transit time.

To limit the amount of background radiation received by the gamma detector 170, the gamma detector 170 preferably includes a field of view shield 180 to limit the field of view of the gamma detector 170. Thus, the SPIN-based material detection system 100 and its source, direct neutron, and field of view shields 130, 160, 180 are preferably designed such that the detection pulse 150 dominates the gamma detector 170 signal. The source, direct neutron, and field of view shields 130, 160, 180 are preferably formed of Tungsten, although other materials effective in stopping neutrons may be used, for example, highly hydrogenous materials. In other preferred embodiments of the present invention, the source, direct neutron, and field of view shields 130, 160, 180 may use tungsten near the neutron source 110 and plastic near the gamma detector 170 to reduce the effect of neutron induced 2-3 MeV characteristics gammas generated in the tungsten. For space or low-pressure environments, the source, direct neutron, and field of view shields 130, 160, 180 required to make sensitive measurements may be reduced in size, resulting in less mass.

The timing and energy of the prompt gammas from the fissionable material in the detection pulse 150 will be different from the timing and energy of the gammas in the background, and thus the two can be differentiated. This prompt gamma portion of the detection pulse 150 contains identifying features that are primarily observed while the neutron source 110 is on, optionally delayed by the target and detector transit times, or within the first 500 nanoseconds or so after the interrogation pulse 120 ends, again optionally delayed by the target and detector transit times. Therefore, the gamma detector 170 has a high data rate (MHz or higher) and preferably consists of a high-sensitivity scintillator (not shown), for example, a lanthanum bromide ($LaBr_3$) crystal, and an optical detector (not shown), for example, a photomultiplier tube (PMT). In some embodiments of the present invention, the gamma detector 170 preferably includes a $LaBr_3$ crystal with an integrated PMT. In alternative embodiments of the present invention, other scintillating detectors or arrays of detectors, for example, pixelated detectors, may be used. In yet other embodiments of the present invention, the gamma detector may be a fast solid-state detector, a gas-phase detector, or a liquid-phase detector. The pixelated detectors, the gas-phase detectors, and the liquid-phase detectors can be directional gamma detectors, which offer certain benefits.

It is important to understand the role of frequency response to avoid confusion. The data recording channels are usually specified in terms of a bandwidth (e.g., MHz) and a sampling rate (e.g., MHz or GHz). This is separate and distinct from the event detection rate (e.g., MHz), which may also be called the event spectroscopy rate. While the data bandwidth, the sampling rate, and the event spectroscopy rate are all measured in units of Hertz, they mean different things. Each event detected needs many records to resolve the shape of the pulse, for example, 20-50 records may be needed for a single gamma pulse of 20 ns width. Therefore, the data recorder may need a GHz sampling rate for a single data channel when employing a MHz event spectroscopy rate. To employ a very high event spectroscopy rate, many data channels may be required. For example, with N data channels, i.e., N gamma detectors 170, one can achieve a spectrum acquisition rate of N times the single channel spectrum acquisition rate. Theoretically, by using many channels of spectrum acquisition with pixelated sensors, an embodiment of the present invention can achieve a nearly arbitrarily high event spectroscopy rate, limited by cost, available volume, and need.

To be effective, the gamma detector 170 preferably has a sufficiently fast full-width at half maximum response, for example, less than 30 nSec, in at least one embodiment of the present invention. Keeping the gamma detector 170 from saturating during the prompt gamma detection portion of the detection pulse 150 requires limiting $\tau$, the duration of the interrogation pulse 120 generated by the neutron source 110 and/or the intensity of the neutron source 110. The data stream from the gamma detector 170 is analyzed using an algorithm that rapidly (<1 second) converts the data stream into gamma spectra. The algorithm bins both the time and the magnitude of the gamma detector 170 responses to create the spectra. The algorithm is tailored to emphasize the short time, fissionable material prompt gamma response, and to maximize the signal-to-noise ratio of the binned signals.

Various embodiments of the invention make use of the prompt gamma emission characteristics of a material that occur during or within 500 μSec of the end of the interrogation pulse 120, optionally delayed by the target and detector transit times of the interrogation pulse 120 and the detection pulse 150, to analyze the material's composition. This is due to more than 99% of the nuclear emissions being created during or within the first 500 μSec of the end of the interrogation pulse 120. See, for example, the previously cited R. C. Runkle et al. Using a short pulse in this manner means that when compared to more traditional techniques, such as PFNA, differential die-away, or nuclear activation analysis, (1) the total dose requirements are reduced by factors of hundreds, and (2) the time required for data acquisition and analysis can be reduced from hours to seconds.

The methodology of various embodiments of the present invention is unique in several ways. For example, the cross sections for the short term individual gamma spectral decays are not well known and the physics, including excited state levels and transition times, are not well known. The most common computer codes for predicting performance of radiation transport are not currently capable of modeling these problems in detail. Thus, experimental measurements are required for the SPIN-based material detection system 100 to enable accurate inverse modeling and determination of materials.

The design for a SPIN-based material detection system 100 in accordance with the present invention depends on the specific system goals. For example, to simply find SNM requires a gamma detector 170 merely capable of detecting a fission spectrum above background. However, characterizing SNM materials adequately generally requires energy resolution in range of 30-100 keV. Improving material identification generally requires enhanced spectroscopy and preferably includes a combination of increased resolution and sensitivity (more neutrons from the neutron source 110 and greater efficiency of the gamma detector 170) to better resolve high energy gamma spectra. The signal-to-noise performance of various embodiments of the present invention roughly scales as $1/(d_1^2 * d_2^2)$, where $d_1$ is the distance from the neutron source 110 to the target 140 and $d_2$ is the distance from the target 140 to the gamma detector 170, with corrections for various efficiencies and target shielding (if present). While the use of an isosceles triangle, for example, as illustrated in FIG. 2B, is incidental, other angles can be used and the signal-to-noise will scale accordingly.

A more quantitative way of understanding the signal and the noise is expressed in the equations below:

$$\text{Signal} \sim Y * \left(\frac{\varepsilon_t}{4\pi d_1^2}\right) * \left(\frac{\varepsilon_{td}}{4\pi d_2^2}\right)$$

$$\text{Noise} \sim Y * \left(\frac{\varepsilon_s}{4\pi d_1^2}\right) + Y * \left(\frac{\varepsilon_{envir}}{4\pi d_2^2}\right)$$

In these equations, Signal refers to the number of events from fissionable, fissile, fertile, or other materials within either a time or an energy window. Y is the neutron source 110 yield in number of neutrons, $d_1$ is the distance between the neutron source 110 and the target 140, $d_2$ is the distance between the target 140 and the gamma detector 170. The four efficiencies are $\varepsilon_t$, the efficiency or probability of an interaction of interest in the target 140; $\varepsilon_{td}$, the efficiency of detection of the emitted reaction product of interest in the gamma detector 170; $\varepsilon_s$, the efficiency of detection of neutron source 110 and source byproducts directly in the gamma detector 170, and $\varepsilon_{envir}$, the efficiency of detection of any radiation from the environment not associated with the target 140 in the gamma detector 170. From this one can design the SPIN-based material detection system 100 for a given application.

The interrogation pulse 120 impacts the target 140 and induces a variety of interactions depending on the materials in the target 140, any shielding that may be present around the target 140, and the background environment. The most important of these interactions are those with SNM that yield prompt fission responses. The prompt fission response includes moderately high energy gammas that are emitted within the first approximately 500 μSec of the neutron interaction. Some of these gammas are able to escape the target 140 and surrounding shielding (if any) and radiate out from the target 140 isotropically as the part of the detection pulse 150. Other interactions between the neutrons in the interrogation pulse 120 and other materials in their path induce lower energy gamma emissions resulting in photoelectric emission, Compton scattering, and pair production in the gamma detector 170. In addition, emission of characteristic x-rays, neutron emissions (especially thermal neutrons), and alpha and beta particles result. The alpha and beta particles are very short range, and thus should not contribute significantly to the detection pulse 150 or the signal from the gamma detector 170. The thermal neutrons have very low energy and preferably are not detected by the gamma detector 170 in certain embodiments of the present invention. The gammas and x-rays will thus be the primary contributors to the signal from the gamma detector 170 utilized for SNM detection, thereby forming the fingerprint for the SNM material.

When a gamma is absorbed by the $LaBr_3$ scintillator crystal, the resultant signal is amplified by the PMT, thereby creating a single analog data stream that is digitized at a high data rate, for example 1 GHz or higher. This can provide an event spectroscopy rate of 1-20 MHz per data channel. By using more than one data channel, the event spectroscopy rate can be increased. Software then converts the digitized data stream into a radiation spectra or gamma spectra. The spectra will be referred to as a "gamma spectra" because gammas are the dominant contributor to the spectra, although characteristic x-rays may also significant. Additional details regarding the software portion of the detection process will be described with reference to FIG. 4.

The time windows used to generate the gamma spectra are an important aspect of various embodiments of the present invention. The gamma spectra are generated during two distinct time windows, with the first time window corresponding to the interrogation pulse 120, optionally delayed by the target and detector transit times. In some embodiments of the present invention, the first time window has a duration equal to the duration of the interrogation pulse 120. In other embodiments of the present invention, the first time window has a duration less than the duration of the interrogation pulse 120. The second time window corresponds to the period immediately after the end of the interrogation pulse 120, again optionally delayed by the target and detector transit times. In some embodiments of the present invention, the second time window corresponds to the first 500 µSec after the end of the interrogation pulse, optionally delayed by the target and detector transit times of the interrogation pulse 120 and the detection pulse 150. In other embodiments of the present invention, the second time window may have a duration either greater or less than 500 µSec, but will start after the end of the interrogation pulse, optionally delayed by the target and detector transit times of the interrogation pulse 120 and the detection pulse 150. These two time windows provide spectra characteristic of SNM and are not utilized by the prior art, including those referenced in Table 1. Various embodiments of the present invention can collect data while the neutron source 110 is on because of the direct neutron shield 160 between the neutron source 110 and the gamma detector 170. The 500 µSec time window immediately after the end of the interrogation pulse, optionally delayed by the target and detector transit times of the interrogation pulse 120 and the detection pulse 150, provides the prompt gamma SNM signature, and the effective use of the spectra in this second time window is unique to various embodiments of the present invention.

The detection method of various embodiments of the present invention can operate in two different modes corresponding to (1) just detection of SNM and (2) detection and identification of SNM. The detection method of other embodiments of the present invention can operate in two different modes corresponding to (1) just detection of explosives (or drugs) and (2) detection and identification of explosives (or drugs). For just detection of SNM, a single, very short neutron pulse is preferred. For detection and identification of SNM, the target is subjected to multiple interrogation pulses, preferably more than five pulses, with the resulting response signals combined and processed to collect sufficient differentiating statistics. This second mode allows the identification of the specific type of SNM, and the identification of surrounding material, for example explosives or shielding.

Figure 2A:
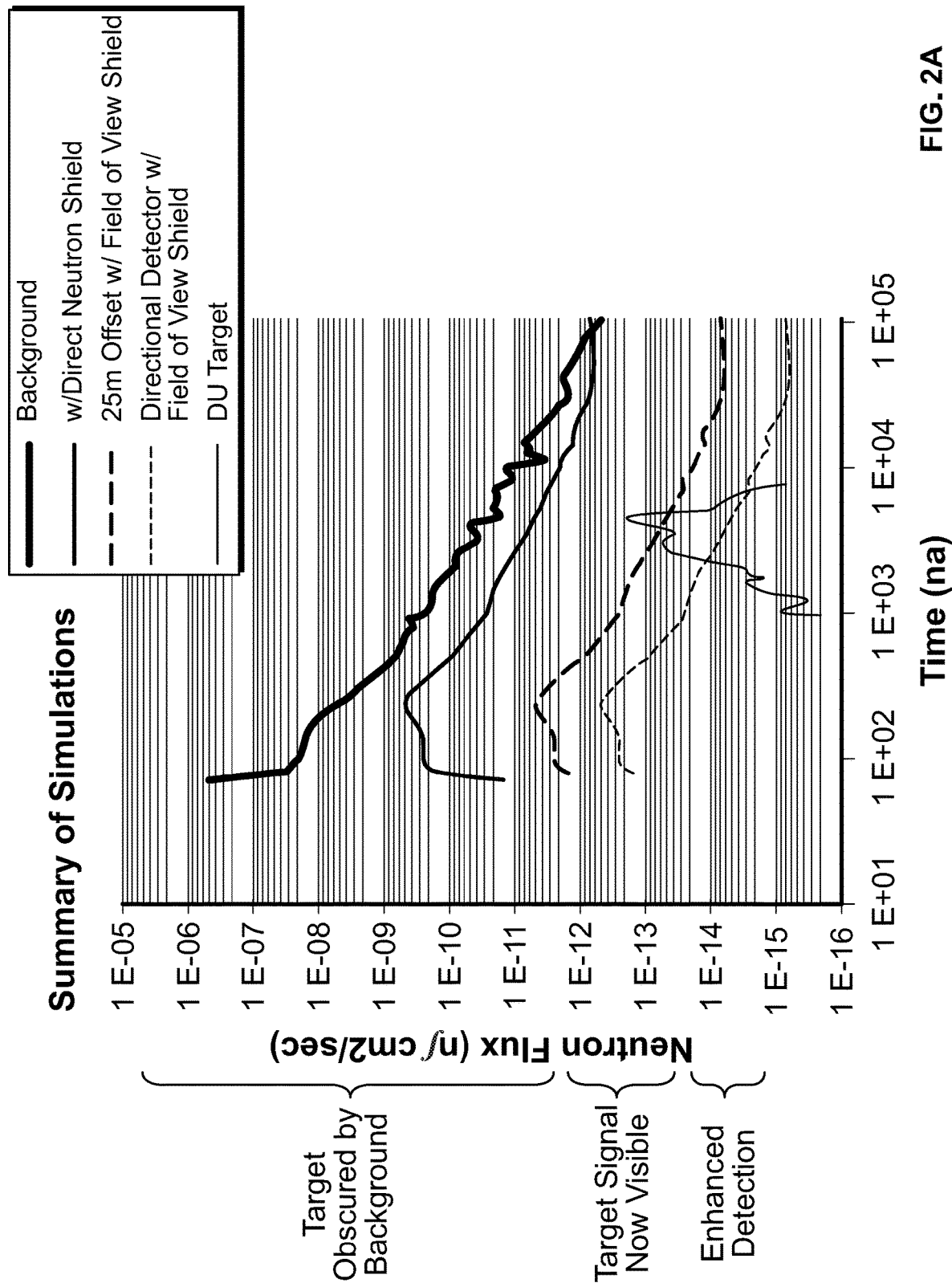
FIG. 2A is a plot of the modeled detection results of one or more embodiments of the present invention at a detection range of 25 meters.
Figure 2B:
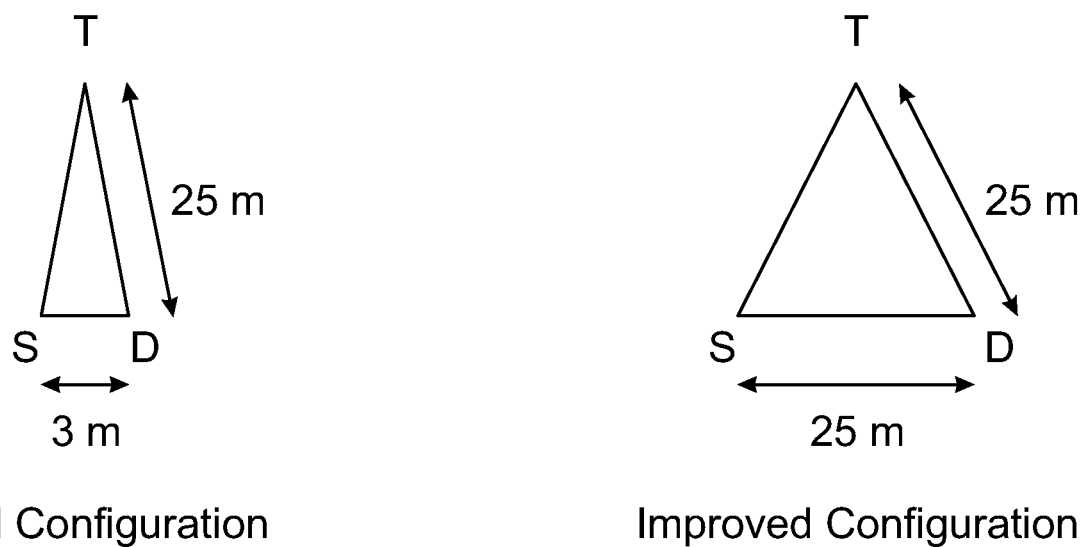
FIG. 2B illustrates the detection geometries used for the various results plotted in FIG. 2A.

FIG. 2A is a plot of the modeled detection results of one or more embodiments of the present invention configured for far-field detection at a range of 25 meters as a function of time after the end of the interrogation pulse 120. As shown in FIG. 2A, the effect of distance is to reduce the useful signal at the gamma detector, i.e., it is a signal-to-noise ratio issue. FIG. 2A shows four curves of increasing sensitivity and a target curve. The lower-most solid gray curve corresponds to a target 140 that includes depleted uranium (DU). The top-most thick solid black curve corresponds to an unshielded gamma detector 170 in the initial configuration illustrated in FIG. 2B. The thin solid black curve corresponds to a radiation, plastic in this case, detector 170 in the initial configuration, but with the addition of a direct neutron shield 160. As the background radiation still dominated the signal with the direct neutron shield 160, three additional approaches to reducing the background radiation signal were explored. The first was to change the geometry of the SPIN-based material detection system 100 by keeping the same distance between the target 140 and the gamma detector 170 but moving the gamma detector 170 further from the neutron source 110, as shown by the improved configuration illustrated in FIG. 2B. The second approach added the field of view shield 180 to the gamma detector 170. The short dashed gray curve corresponds to the modeled background based upon the combination of the improved configuration shown in FIG. 2B and the field of view shield 180. With this combination, the background signal dropped by approximately two orders of magnitude, causing the signal from the DU target to rise above the background. With a resultant signal-to-noise ratio of approximately four, this combination makes detection feasible.

The third approach was to use an inherently directional gamma detector 170 in addition to a completely revised source shield 130, direct neutron shield 160, and field of view shield 180 focusing, at least in part, on weight reduction. This resulted in the bottom-most, long dashed gray curve where the signal from the DU target can be seen to rise above this computed background curve by more than an order of magnitude, i.e., a signal-to-noise ratio in excess of ten. A particle tracking detector is an example of an inherently directional gamma detector that could result in such an increase in the signal-to-noise ratio. The directional gamma detector 170 does not require the mass of the field of view shield 180 but increases the complexity of the gamma detector 170. See, for example, U.S. Pat. No. 7,274,020 (issued Sep. 25, 2007), the contents of which are incorporated herein by reference, for a discussion of one type of directional gamma detector. A massive amount of shielding could also provide the same improvement in signal-to-noise ratio as the directional gamma detector, but with a huge weight penalty.

As shown on the vertical axis, the neutron flux falls into three ranges. In the highest ranges of neutron flux, the gamma and neutron signal from the target 140 is obscured by the background flux. At more moderate levels of neutron flux, the gamma signal from the target 140 is detectable. At the optimum neutron flux, detection is enhanced and the gamma signal from the target 140 is readily detectable due to the signal-to-noise ratio being greater than approximately ten.

A geometric solution for overcoming a portion of this signal-to-noise ratio issue in one or more embodiments of the present invention is reflected in FIG. 2B. The geometric portion of the solution increases the physical separation of the neutron source 110 and the gamma detector 170. As shown in FIG. 2B, the initial configuration placed both the neutron source 110 and the gamma detector at a distance of 25 meters from the target 140 but separated the neutron source 110 from the gamma detector 170 by only 3 meters. In the improved configuration, both the neutron source 110 and gamma detector 170 are located 25 meters from the target 140, but the neutron source 110 and the gamma detector 170 are now separated by 25 meters as well.

A shielding solution for overcoming a portion of the signal-to-noise ratio issue in one or more embodiments of the present invention reduces the background gamma signal from (1) the neutron generator 110 through a combination of the source shield 130 and the direct neutron shield 160, and (2) by directional detection, for example, by limiting the field of view of the gamma detector 170 through the use of the field of view shield 180. In addition, a larger gamma detector 170 or array of gamma detectors 170 may be used, all directed at the target 140, and shielded from radiation from the neutron source 110 and background radiation. As with the detection and identification mode previously described, multiple interrogation pulses 120 may be used and their corresponding detection pulses 150 summed for better statistics due to the weaker detection pulses 150 caused by the 25 meter distance. The preferred solution to overcoming the signal-to-noise ratio issue is a combination of geometric separation between the neutron source 110 and the gamma detector 170, and the addition of the source, direct neutron, and field of view shields 130, 160, 180.

Figure 3:
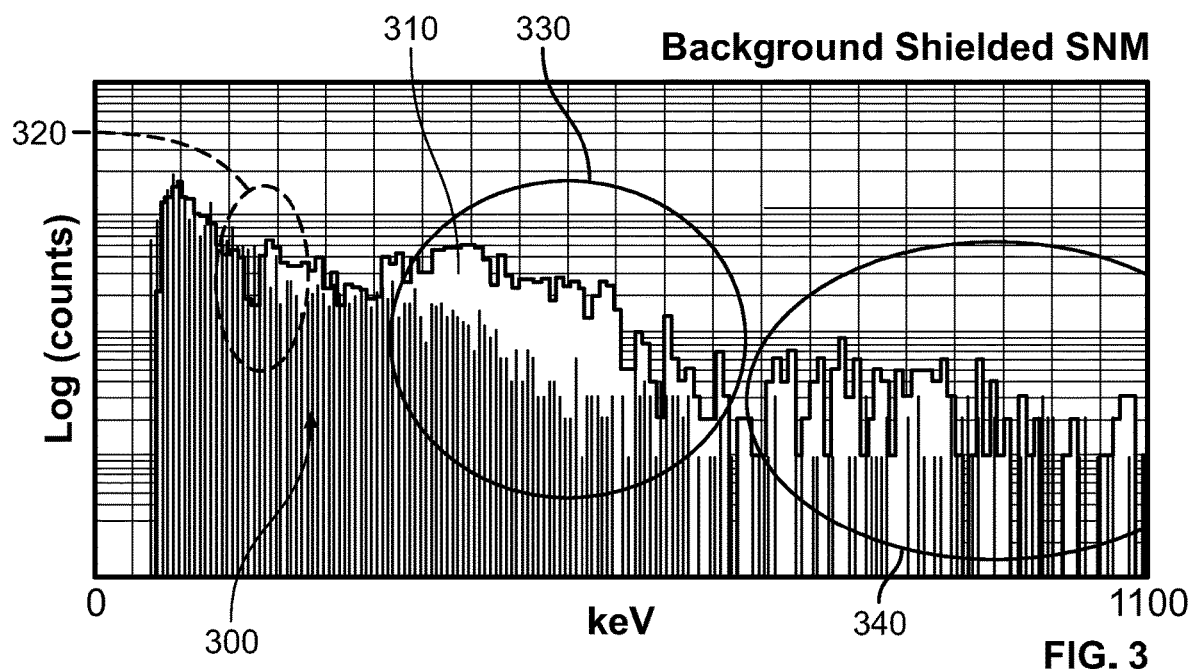
FIG. 3 illustrates a typical analyzed spectrum with a moderate-resolution detector in the near field in accordance with one or more embodiments of the present invention.

FIG. 3 shows two representative spectra comparing background radiation. In the first spectrum 300, represented by the vertical white bars, no SNM was present, and thus it represents the background radiation. In the second spectrum 310, represented by vertical gray bars, shielded SNM was present, and corresponds to the fingerprint for the shielded SNM. The horizontal axis of FIG. 3 corresponds to gamma energy in keV, while the vertical axis corresponds to the number of gamma counts, plotted logarithmically. The same neutron interrogation intensity, energy, and duration were used for both spectrum—within the repeatability of the neutron source. These spectra were taken less than 1 μSec after the neutron pulse ended. Several features stand out in this comparison.

First, there is a clear difference between the first (background) spectrum 300 and the second (shielded SNM) spectrum 310. This was confirmed using Chi-squared statistics, as will be discussed subsequently. This difference forms the basis for the method of detecting SNM, whether shielded or unshielded, in various embodiments of the present invention.

Second, at the low energy end of the shielded SNM spectrum 310 is a sharp drop in counts 320 and then recovery for the shielded SNM signal compared to the background spectrum 300. This is indicative of an absorption feature between 1 and 300 keV, and is a function of the material being interrogated, such as a characteristic x-ray of the K or L shell energy. Further, the depth of this drop in counts 320 is indicative of the photon absorption from the fissionable material in the shielding, and this offers detailed information about the target.

Third, there is a high number of counts in the mid-energy gamma range 330 of the shielded SNM spectrum 310. These additional counts are observed in the shielded SNM spectrum 310, and not found in the background spectrum 300, are indicative of the prompt fission gammas characteristic of the shielded SNM.

Fourth, at the higher gamma energy end of the shielded SNM spectrum 310 there are significantly higher counts 340 not present in the background spectrum 300. These higher counts 340 are indicative of SNM containing high atomic number constituents and their corresponding resulting high gamma energy emissions.

The shielded SNM spectrum 310 does not include enough energy resolution to identify the specific constituents of the shielded SNM material. FIG. 3 does, however, demonstrate SNM detection using one or more embodiments of the present invention. FIG. 3 also demonstrates that the fingerprint for a material may include both reduced and enhanced counts in various energy ranges.

Figure 4B:
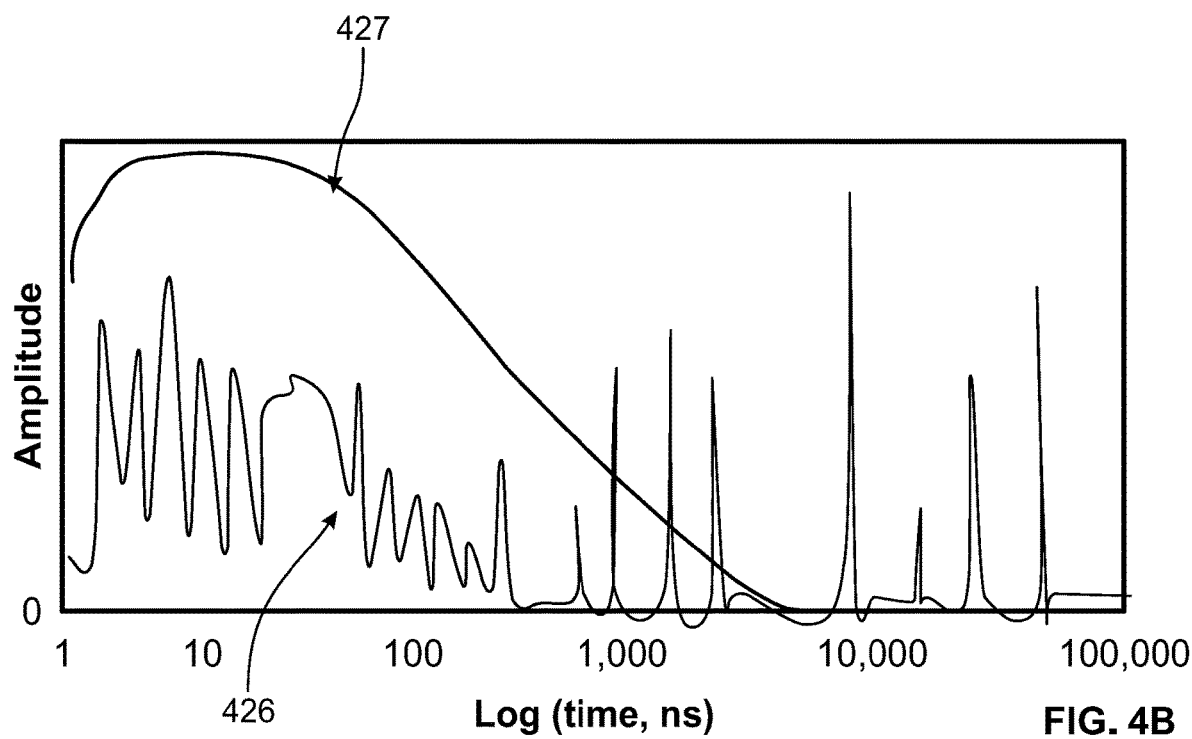
FIG. 4B illustrates the data at a point in the detection methodology illustrated in FIG. 4A.
Figure 4A:
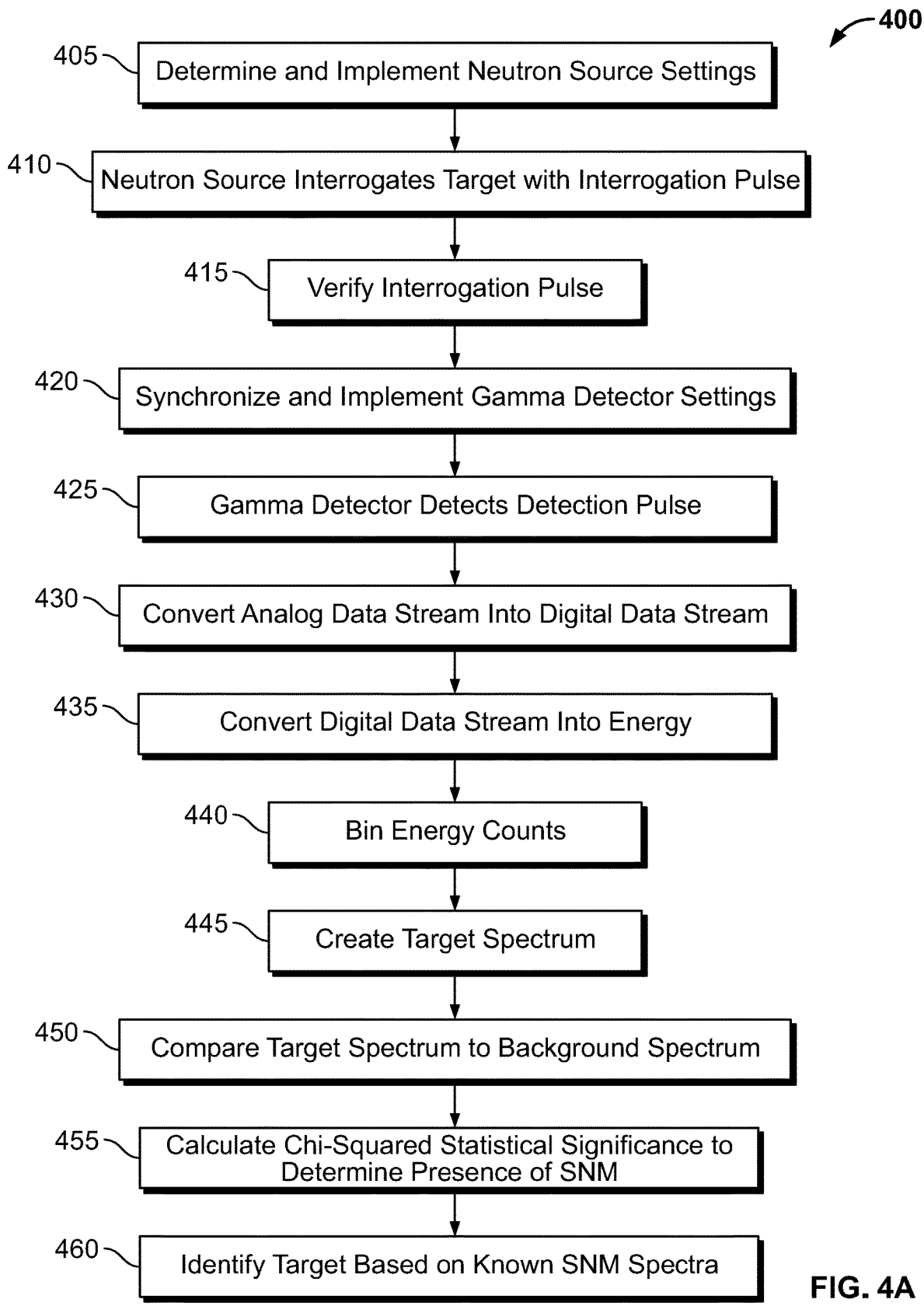
FIG. 4A illustrates a flow chart of the detection methodology in accordance with one or more embodiments of the present invention.

FIG. 4A is a flow chart describing the algorithm 400 used to detect SNM, from neutron interrogation to time history to spectral conversion to Chi-squared verification of detection, for one or more embodiments of the present invention.

In step 405, a controller determines and implements the appropriate settings for a neutron source. These settings include the timing, width, and amplitude of the neutron pulse corresponding to the interrogation pulse.

In step 410, the neutron source interrogates the target with an interrogation pulse having the preset pulse width τ, corresponding to the first time window described above, and amplitude. The neutron source preferably provides a predictable number of high energy neutrons, typically based on a deuterium-tritium (D-T) reaction, corresponding to the desired intensity, during the first time window for the specified drive conditions. The interrogation pulse amplitude and width τ are verified with a neutron detector in step 415.

In step 420, the controller synchronizes the timing of a gamma detector with the neutron source, optionally taking into account the target and detector transit times, and implements the gamma detector settings, for example, the scintillator settings, the PMT voltage, the data collection/digitization rate, and the first and second time windows. In some embodiments of the present invention, the gamma detector may be triggered by a power supply signal in the neutron source.

In step 425, the gamma detector detects the detection pulse, thereby generating an analog data stream 426, such as that illustrated in FIG. 4B. The analog data stream 426 is generated during the interrogation pulse, i.e., the first time window, and just after it, i.e., the second time window, preferably the first 500 μSec after the end of the interrogation pulse, optionally subject to the target and detector transit times. FIG. 4B also illustrates the amplitude of a 100 nSec interrogation pulse 427 for comparison. Note that the horizontal (time) axis of FIG. 4B is plotted logarithmically. While the example illustrated in FIG. 4B employs an interrogation pulse 427 having a duration of 100 nSec, some embodiments of the present invention employ an interrogation pulse 427 having a duration of less than 100 nSec, while other embodiments of the present invention may employ an interrogation pulse 427 having a duration greater than 100 nSec.

More specifically, FIG. 4B illustrates a coarse representation of the analog data stream corresponding to a prompt fission SNM response to a short, high intensity, high energy neutron interrogation pulse. Pulse pile-up may be an issue as it can cause PMT saturation, leading to an unrealistically low number of gamma counts and poor spectral resolution. Various embodiments of the present invention solve this issue in two ways. First, the controller may set a high data collection/digitization rate of the analog data stream. This allows separation of gamma counts that had previously been combined in a single, longer time window. Second, the number of neutrons per interrogation pulse may be reduced, i.e., a more moderate intensity, is used. This moderate intensity interrogation pulse reduces pulse pile-up, yielding more accurate counts. This permits an increase in the gain of the PMT without saturation, yielding additional counts of the more numerous lower energy gammas, and resulting in better resolution spectra.

In step 430, the analog data stream 426 is converted into a digital data stream based upon the selected first and second time windows by an analog-to-digital converter. A signal processor will further process the digital data stream. The signal processor may or may not be separate from the controller for convenience of post-processing the digital data stream. The signal processor, which implements steps 430, 435, 440, 445, 450, 455, and 460, preferably includes hardware, firmware, and software. Further, the signal processor may be a single signal processor or a distributed signal processor.

In step 435, calibration data from known spectra samples, for example, Cs-137, Co-60, or other sources, using the same gamma detector conditions, for example, the same scintillator and PMT settings, are used to convert the digital data stream from amplitude (volts) to energy (keV). The resultant counts are binned based upon energy in step 440. FIG. 3 is an exemplary output of the conversion and energy binning process steps 435, 440. In step 445, the number of counts in each energy bin are then determined to create a target spectrum, i.e., the target's fingerprint. In step 450, this resulting target spectrum is compared to a library of background spectra (i.e., fingerprints) collected from known nulls (cases in which no SNM is present) for the same interrogation pulse and gamma detector conditions and a number of operational factors, such as operating environments and potential targets. Alternatively, the resulting target spectrum is compared to a background spectrum generated from a library of null responses corresponding to actual interrogation pulse and gamma detector conditions and operational factors.

In step 455, a Chi-squared statistical significance test is used to compare the target spectrum to the null spectrum. If there is a statistically significant difference, then a determination is made that SNM (or other material) is present. In step 460, the target spectrum is compared to a library of spectra in which various SNM (or other materials) are known to be present with various operational factors, and the type(s) of SNM (or other materials) present are identified.

The entire algorithm 400 may take on the order of a second to complete for each cycle. As described above, multiple cycles may be employed and combined in certain embodiments of the present invention.

As will be appreciated, the order of the above steps may be altered, various steps may be combined, and one or more steps may be added or deleted depending upon the specific embodiment of the present invention.

Figure 5A:
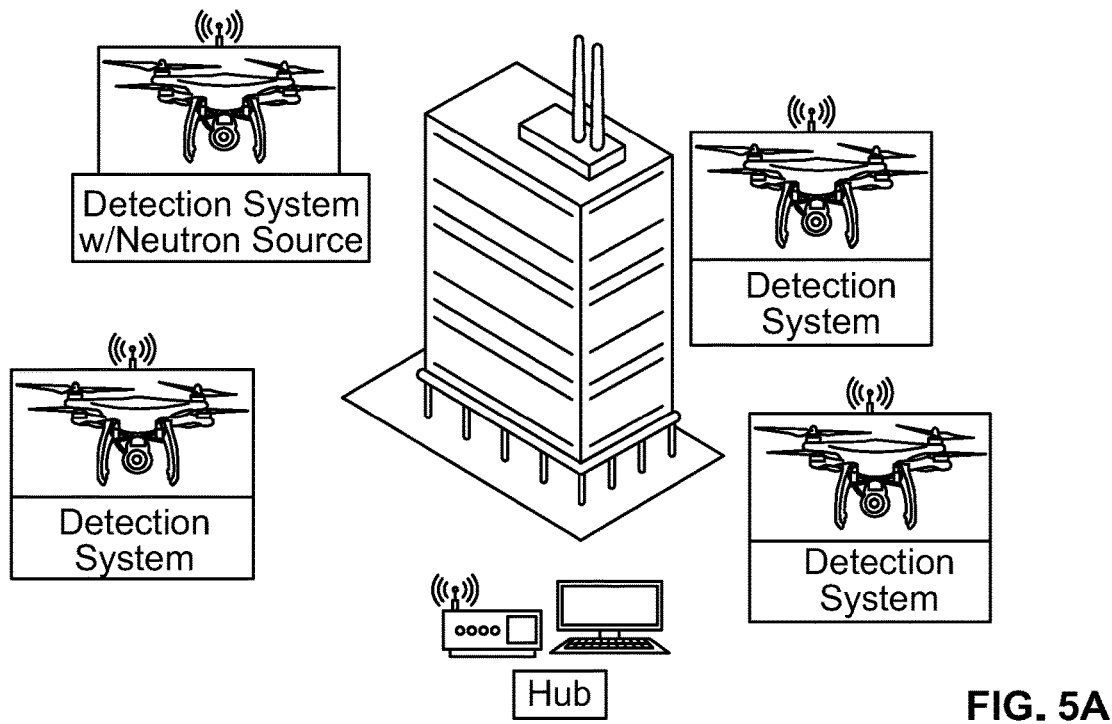
FIGS. 5A-5B illustrate system configurations in accordance with two different embodiments of the present invention.
Figure 5B:
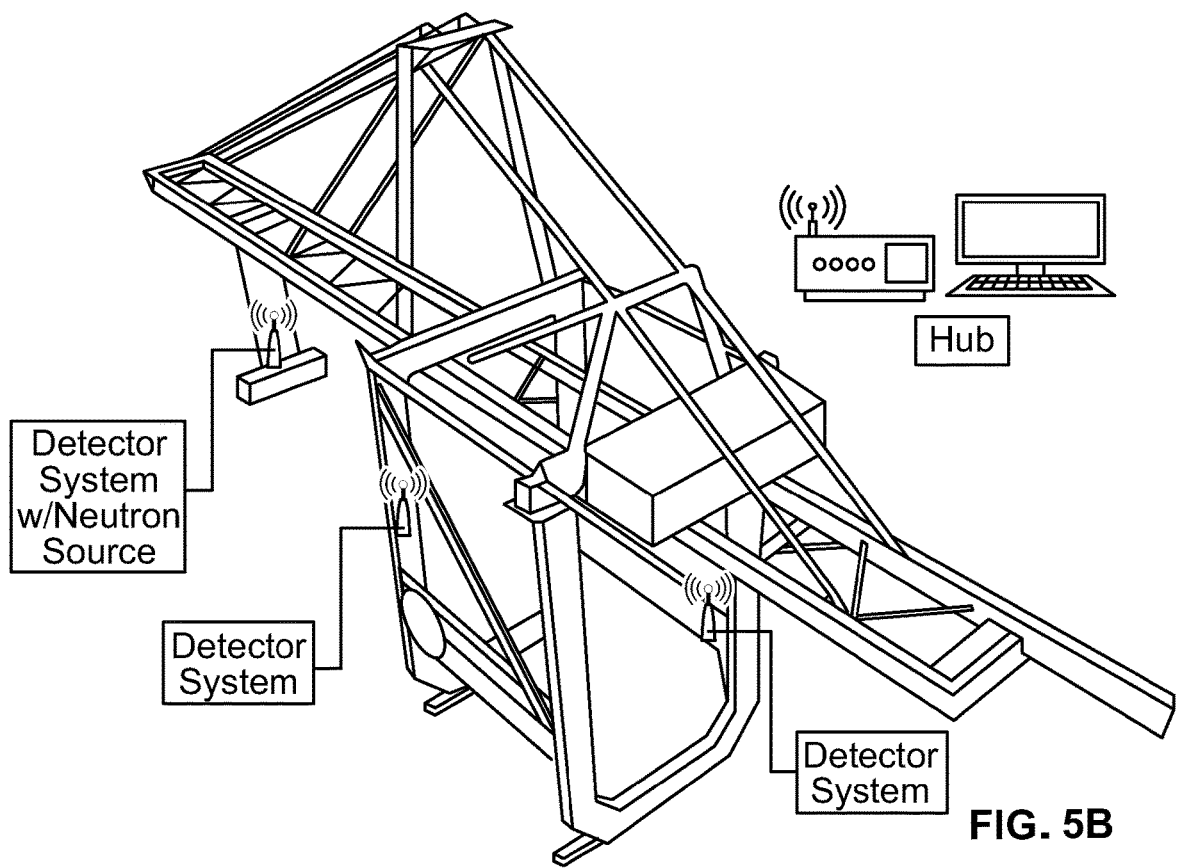

FIGS. 5A and 5B show embodiments of the present invention used to check for SNM in a roving application and at a port to examine a shipping container, respectively. As will be appreciated, multiple neutron sources and/or gamma detectors may be used at different distances. The port application illustrated in FIG. 5B is more controlled and would allow for a fully automated embodiment of the present invention that could be used to check for SNM, explosives, or drugs without slowing down commerce. However, in other embodiments of the present invention, the size, weight, and power (SWaP) of the entire system is low enough to permit portable use in the roving application illustrated in FIG. 5A. While the embodiments illustrated in FIGS. 5A and 5B include a single neutron source and multiple detection systems to improve detection sensitivity, a single detection system may be employed in other embodiments of the present invention.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A material detection system comprising:
   a neutron source adapted to emit an interrogation pulse of neutrons having a duration τ toward a target;
   a gamma detector adapted to detect a detection pulse including gamma rays from the target that are prompted by the neutron source and to output an analog data stream indicative of the detection pulse, a first portion of the analog data stream corresponding to a first time window having a duration T1 less than or equal to τ, a second portion of the analog data stream corresponding to a second time window having a duration T2 from an end of the interrogation pulse;
   an analog-to-digital converter adapted to convert the analog data stream corresponding to at least one of the first or second time windows into a digital data stream; and
   a signal processor, the signal processor adapted to convert the digital data stream into energy counts, to bin the resultant energy counts, to create a target spectrum based on the binned energy counts, to compare the target spectrum to a background spectrum, and to determine a presence of a material in the target;
   wherein the interrogation pulse of neutrons has a velocity $v_i$;
   wherein the neutron source is a distance $d_1$ from the target resulting in a target transit time $t_1=d_1/v_i$;
   wherein the detection pulse has a velocity $v_d$;
   wherein the gamma detector is a distance $d_2$ from the target resulting in a detector transit time $t_2=d_2/v_d$;
   wherein a total transit time corresponds to a sum of the target transit time and the detector transit time;
   wherein the first portion of the analog data stream corresponds to the first time window delayed by the total transit time from a start of the interrogation pulse; and
   wherein the second portion of the analog data stream corresponds to the second time window delayed by the total transit time from the end of the interrogation pulse.

2. The material detection system of claim 1, wherein the neutron pulse duration τ is less than or equal to approximately 100 nSec.

3. The material detection system of claim 1, wherein the material in the target is one of special nuclear material, explosives, and drugs.

4. The material detection system of claim 3, wherein the background spectrum is generated from a library of background spectra when no special nuclear material, explosives, and drugs are present corresponding to actual interrogation pulse and gamma detector conditions, and operational factors.

5. The material detection system of claim 1, wherein the signal processor is further adapted to determine an identity of the material in the target.

6. The material detection system of claim 5, wherein the signal processor determines the identity of the material in the target by comparing the target spectrum to a library of spectra in which predetermined materials are known to be present with various operational factors.

7. The material detection system of claim 5, wherein the signal processor determines the identity of the material in the target based upon a reduction in energy counts relative to the background spectrum.

8. The material detection system of claim 5, wherein the signal processor determines the identity of the material in the target based upon an increase in energy counts relative to the background spectrum.

9. The material detection system of claim 1, wherein the gamma detector has a full-width at half maximum response equal to or less than approximately 30 nSec.

10. The material detection system of claim 1, wherein the digital data stream has a data sampling rate equal to or greater than approximately 1 GHz.

11. The material detection system of claim 1, wherein the digital data stream has an event spectroscopy rate equal to or greater than approximately 1 MHz.

12. The material detection system of claim 1,
wherein when the processor determines the presence of the material in the target, the processor is adapted to implement a Chi-squared statistical significance test; and
wherein if the Chi-squared statistical significance test results in a statistically significant difference, then a determination is made that a predetermined material is present.

13. The material detection system of claim 1,
wherein the neutron source is adapted to emit a plurality of interrogation pulses toward the target; and
wherein the processor is adapted to combine and process a plurality of digital data streams corresponding to the plurality of interrogation pulses.

14. The material detection system of claim 1, wherein the gamma detector includes a plurality N of gamma detectors.

15. The material detection system of claim 14, wherein the digital data stream has a data rate equal to or greater than approximately N*1 GHz.

16. The material detection system of claim 14, wherein the digital data stream has an event spectroscopy rate equal to or greater than approximately N*1 MHz.

17. The material detection system of claim 1, wherein the gamma detector includes at least one of a scintillator-based detector, a fast solid-state detector, a gas-phase detector, and a liquid-phase detector.

18. The material detection system of claim 1, wherein the gamma detector includes a directional gamma detector.

19. A material detection system comprising:
a neutron source adapted to emit an interrogation pulse of neutrons having a duration $\tau$ toward a target, the interrogation pulse of neutrons having a velocity $v_i$, the neutron source being a distance $d_1$ from the target resulting in a target transit time $t_1 = d_1/v_i$;
a gamma detector adapted to detect a detection pulse including gamma rays from the target that are prompted by the neutron source, the detection pulse having a velocity $v_d$, the gamma detector being a distance $d_2$ from the target resulting in a detector transit time $t_2 = d_2/v_d$, a total transit time corresponding to a sum of the target transit time and the detector transit time, the gamma detector adapted to output a first analog data stream indicative of the detection pulse, a first portion of the first analog data stream corresponding to a first time window having the duration $\tau$, a second portion of the first analog data stream corresponding to a second time window having a duration less than or equal to T from an end of the interrogation pulse, the gamma detector also adapted to output a second analog data stream indicative of the detection pulse, a first delayed portion of the second analog data stream corresponding to a first delayed time window having the duration $\tau$ and delayed from a start of the interrogation pulse by the total transit time, a second delayed portion of the second analog data stream corresponding to a second delayed time window having a duration less than or equal to T delayed from the end of the interrogation pulse by the total transit time;
an analog-to-digital converter adapted to convert the first analog data stream corresponding to at least one of the first and second time windows into a first digital data stream and to convert the second analog data stream corresponding to at least one of the first and second delayed time windows into a second digital data stream; and
a signal processor, the signal processor adapted to convert the first and second digital data streams into corresponding first and second energy counts, to bin the resultant first and second energy counts, to create corresponding first and second target spectra based on the binned energy counts, to compare the first and second target spectra to a background spectrum, and to determine a presence of a material in the target.

* * * * *